United States Patent
Mosebach et al.

(10) Patent No.: US 11,934,199 B2
(45) Date of Patent: Mar. 19, 2024

(54) METHOD FOR OPERATING A SYSTEM WITH TWO AUTOMATICALLY MOVING FLOOR PROCESSING DEVICES AS WELL AS SYSTEM FOR IMPLEMENTING SUCH A METHOD

(71) Applicant: Vorwerk & Co. Interholding GmbH, Wuppertal (DE)

(72) Inventors: Andrej Mosebach, Unna (DE); Marc Papenheim, Wuppertal (DE); Henning Hayn, Hilden (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 117 days.

(21) Appl. No.: 17/144,404

(22) Filed: Jan. 8, 2021

(65) Prior Publication Data
US 2021/0216080 A1    Jul. 15, 2021

(30) Foreign Application Priority Data
Jan. 10, 2020   (DE) .................... 10 2020 100 447.8

(51) Int. Cl.
*G05D 1/02*   (2020.01)
*G05D 1/00*   (2006.01)

(52) U.S. Cl.
CPC ......... *G05D 1/0287* (2013.01); *G05D 1/0231* (2013.01); *G05D 1/0274* (2013.01); *G05D 2201/0203* (2013.01)

(58) Field of Classification Search
CPC ................... G05D 2201/0203; G05D 1/0287
See application file for complete search history.

(56) References Cited

U.S. PATENT DOCUMENTS

| 6,374,155 B1 | 4/2002 | Wallach et al. |
| 11,274,929 B1 * | 3/2022 | Afrouzi ............... A47L 11/4083 |
| 11,341,781 B2 * | 5/2022 | Williams ............... G08G 1/017 |
| 2019/0212752 A1 * | 7/2019 | Fong ..................... G05D 1/0274 |

FOREIGN PATENT DOCUMENTS

EP       3293326 A1 *  3/2018  ........... E04H 4/1654

* cited by examiner

*Primary Examiner* — Jeff A Burke
*Assistant Examiner* — Christopher A Buksa
(74) *Attorney, Agent, or Firm* — Collard & Roe, P.C.

(57) ABSTRACT

A method for operating a system with a first automatically moving floor processing device and a second automatically moving floor processing device in which the first floor processing device detects environmental features in an environment of the first floor processing device. The first floor processing device or a shared computing device allocated to both the processing devices generates a first area map based on the detected environmental features, and the first floor processing device also detects the second floor processing device, and the position of the second floor processing device is thereupon stored within the generated first area map. The second floor processing device receives information about a current position of the second floor processing device within the first area map, and controls a second floor processing activity as soon as the first floor processing device has detected the second floor processing device.

6 Claims, 4 Drawing Sheets

Fig. 4

METHOD FOR OPERATING A SYSTEM WITH TWO AUTOMATICALLY MOVING FLOOR PROCESSING DEVICES AS WELL AS SYSTEM FOR IMPLEMENTING SUCH A METHOD

CROSS REFERENCE TO RELATED APPLICATIONS

Applicant claims priority under 35 U.S.C. § 119 of German Application No. 10 2020 100 447.8 filed on Jan. 10, 2020, the disclosure of which is incorporated by reference.

BACKGROUND OF THE INVENTION

1. Field of the Invention

The invention relates to a method for operating a system with a first automatically moving floor processing device and a second automatically moving floor processing device, wherein the first floor processing device detects environmental features in an environment of the first floor processing device, wherein the first floor processing device or a shared computing device allocated to both the first floor processing device and the second floor processing device generates a first area map based on the detected environmental features, and wherein the first floor processing device also detects the second floor processing device, and the position of the second floor processing device is thereupon stored within the generated first area map.

The invention further relates to a system with a first floor processing device and a second floor processing device for implementing a method of the aforementioned type.

2. Description of the Related Art

Systems with several automatically moving floor processing devices that are directly connected with each other via a shared communications network are known in the art. For example, the floor processing devices can be floor processing robots such as cleaning robots, polishing robots, mowing robots or the like. At least one of the floor processing devices has a navigation and self-localization system, which is suitable for generating an area map of the environment, and for localizing and moving itself based upon this area map. In addition, it is also known in prior art that the floor processing devices can access a shared area map, which is stored in an external storage memory device.

U.S. Pat. No. 6,374,155 B1 further discloses a system with several robots, of which one of the robots serves as the navigation robot, and at least one other robot can perform activities such as vacuuming, mopping or the like. The navigation robot generates a map of the environment, and localizes itself as well as one or more functional robots in the generated area map. The navigation robot subsequently plans floor processing activities to be performed by the functional robots.

The disadvantage to the aforementioned system or method is that the navigation robot itself performs no floor processing activities, but rather serves exclusively to generate maps and plan operational activities for the functional robots. As a result, an additional robot is required for implementing the method known in prior art.

SUMMARY OF THE INVENTION

Proceeding from the aforementioned prior art, it is thus the object of the invention to create a method for operating a system with several automatically moving floor processing devices that yields a resource- and time-saving processing of the environment.

In order to achieve this object, it is proposed that the second floor processing device receive information about a current position of the second floor processing device within the first area map already during a first floor processing activity performed by the first floor processing device, and control a second floor processing activity as soon as the first floor processing device has detected the second floor processing device.

According to the invention, the system has at least one automatically moving floor processing device, which can both automatically perform floor processing activities within the environment, and also detects environmental features in the environment as well as a current position of at least one other floor processing device. Based on the detected environmental features, an area map can be generated either by the first floor processing device itself, or by a central computing device, which is allocated to both floor processing devices of the system. Since the first floor processing device thus simultaneously performs a floor processing activity and detects information about the current positions of other floor processing devices, the invention allows a second floor processing activity of a second floor processing device to be started even during the floor processing activity of the first floor processing device. As a result, the cleaning activities of several floor processing devices can be synchronized very quickly within a networked system of floor processing devices. In particular, the several floor processing devices access the same area map, for example the area map generated by the first floor processing device and/or an area map filed in a central storage device. This area map can likewise be generated by the first floor processing device, or also by another floor processing device or the shared computing device of the system. Based on this area map and the received positional information, each floor processing device then independently controls its movement and floor processing activity. Because ongoing floor processing activities of several floor processing devices overlap in time, a time required for floor processing the environment can be shortened. Since the second floor processing device does not have to generate an area map itself and localize itself therein, but rather receives information required for navigation based on the already generated first area map, navigation and self-localization tasks are completed especially quickly and efficiently.

The system according to the invention can especially advantageously be used where two floor processing devices are to perform complementary floor processing activities in the environment. For example, the floor processing devices can clean two different partial environmental areas of the environment simultaneously, or the same partial environmental area in direct chronological sequence. For example, the first floor processing device can be a vacuuming robot, and the second floor processing device can be a mopping robot. In order to optimally clean a hard floor, for example a parquet floor, laminate floor, tile floor or the like, a vacuuming and mopping operation preferably follow each other in sequence. The mopping operation by the second floor processing device can be chronologically integrated into the floor processing run of the first floor processing device, such that the mopping operation is begun while the vacuuming operation of the first floor processing device is still underway. The first floor processing device travels locally from one first partial environmental area to a second partial environmental area, so that a first, already vacuumed partial environmental area is mopped by the second floor processing device, while the first floor processing device still performs a vacuuming job in a next, second partial environmental area. It can here be provided that the second floor processing device only be started after a delay if a partial environmental area that is currently being processed or has already been processed by the first floor processing device is not yet reaching a defined minimum size. This is advantageous in particular in the case where the first floor processing device already detects another, second floor processing device directly after starting a floor processing activity, and thus is still right at the beginning of the floor processing activity in terms of time. In an embodiment, the area map can define partial environmental areas, for example delimited by detected walls, obstacles, floor covers and the like, so as to only start a second floor processing activity by a second floor processing device once a defined partial environmental area has been completely processed by the first floor processing device. The second floor processing device can start its subsequent floor processing activity at a location in the partial environmental area having the shortest distance to the current whereabouts of the second floor processing device. Alternatively, it is also possible for the second floor processing device to start at the same location where the first floor processing device previously started the first floor processing activity.

In order for the first floor processing device to be able to detect or identify a second floor processing device, the floor processing devices can have clear identification codes, based on which they can be recognized by one or several other floor processing devices. Accordingly, the floor processing devices networked in the system have corresponding detection devices, with which the identification codes can be read out. For example, if the code involves an optical code, a corresponding optical detection device is necessary.

According to one embodiment, for example, the first floor processing device can have a camera, which is designed to read out a QR code, color code or other optical code of another, second floor processing device. The code or the codes of several floor processing devices can be stored in a database, which all floor processing devices can access. As an alternative to optical codes, use can also be made of electronic tags, for example based on RFID, NFC, Bluetooth beacons or others, which store a clear ID of the floor processing device. The identification of floor processing devices can be supported by a communication between two or more floor processing devices. For example, if a first floor processing device recognizes a second floor processing device as a floor processing device based on its exterior shape, the first floor processing device can send out a query signal, which preferably all floor processing devices can receive. This query signal can contain a request that the floor processing device receiving the query itself detect the environment and search out the floor processing devices contained therein. It is highly probable that the first floor processing device is in front of the second floor processing device that sees another floor processing device in the environment it detected. As a consequence, the first floor processing device can conclude that it is currently detecting the second floor processing device, while the second floor processing device can conclude that it is currently detecting the first floor processing device. In addition, base stations allocated to specific floor processing devices can have a clear identification. In this case, the identified base station is used to draw a conclusion about the identity of a floor processing device in the area of this base station. The respective floor processing device detects environmental features within the environment of its base station, and generates a local area map. If a second floor processing device now detects a base station within this environment, a conclusion can be drawn about the identity of the base station or of the floor processing device located in the vicinity by comparing the current map information of the second floor processing device and the map information of the first floor processing device.

A possible embodiment of the invention can provide that the first floor processing device generate the first area map and transmit it directly to the second floor processing device. According to this embodiment, it is not absolutely necessary for the floor processing devices to be connected with each other via a communications network, even though the floor processing devices can also be part of a wireless communications network. The first floor processing device thus sends the generated area map directly to the second floor processing device, for example without any intermediate storage in a server. To this end, a radio signal can advantageously be transmitted from the first floor processing device to the second floor processing device, in particular a Bluetooth signal or a WLAN signal, for example. Therefore, if the first floor processing device detects a second floor processing device during a floor processing activity, the first floor processing device transmits its currently generated area map together with an estimated position of the second floor processing device within the area map to the second floor processing device. The second floor processing device receives the signal of the first floor processing device, and obtains information about its current position relative to the coordinates of the area map of the first floor processing device. The second floor processing device can thereupon directly start its own floor processing activity. Additional information can be transmitted to the second floor processing device with the area map or stored therein, for example information about which partial environmental areas in the environment were already processed by the floor processing device, and which floor coverings, contamination parameters or contamination levels are present in the partial environmental area.

In addition, the first area map of the first floor processing device and the position of the second floor processing device noted therein can be continuously updated during a movement of the first floor processing device. In this embodiment, the area map is always kept updated while the first floor processing device moves within the environment. At the same time, the detected position of the second floor processing device is also updated, so that the second floor processing device always knows where it is located within the area map. As a consequence, it is not necessary that the second floor processing device itself also have a navigation and self-localization device. The floor processing progress can also be entered in the area map. For example, a user with an external terminal can preferably access the generated area map and view it. An application which can display the area map is preferably installed on the terminal.

It is further proposed that the first floor processing device detect floor parameters of the partial environmental areas of the environment, an operating state of partial environmental areas processed or not processed by the first floor processing device and/or a movement route of the first floor processing device through one or several partial environmental areas, and store them in the first area map, or as an alternative detect the latter and transmit them to the shared computing device. For example, the floor parameters of the partial environmental areas can be a floor type, a contamination type and/or a contamination level within the respective partial environmental area. For example, hard floors and carpeted floors can be distinguished as a floor type, in particular classified further into low-pile carpets or carpeted floors, high-pile carpets or carpeted floors, wood floors, tile floors and others. A contamination type can be classified by consistency (dry, liquid, sticky, or others) or composition (fat, wine, or others). A contamination level can be defined as a percentage of a standardized maximum contamination level, for example wherein a contamination level of 100 percent represents a maximum contamination defined in this way. It is further possible to establish contamination categories, for example light contamination, medium contamination, and heavy contamination. The contamination level can represent a level to which the surface of the partial environmental area is covered with dirt, a quantity of dirt per surface area picked up by the first floor processing device, or the like. Based on the information about floor type, contamination type and/or contamination level, the second floor processing device can check which setting parameters are suitable for a successful subsequent cleaning. The second floor processing device can also plan its own movement route through the environment based on the information about a processing state of a partial environmental area or on knowledge about whether a specific partial environmental area lies on a preceding movement route of the first floor processing device. As a consequence, all information required by the second floor processing device to perform a successful floor processing operation is available. In particular, a second floor processing activity can be performed at a location on a movement route of the first floor processing device.

It is proposed that the second floor processing activity of the second floor processing device only be performed in a specific partial environmental area if a first floor processing activity was performed in this partial environmental area beforehand by the first floor processing device, and/or that the second floor processing activity of the second floor processing device only be performed in a specific partial environmental area if the second floor processing device is suitable for processing the floor of this partial environmental area. The alternative mentioned first takes account of a circumstance in which a floor processing of the second floor processing device depends on a successful preceding floor processing of the first floor processing device in the same partial environmental area. For example, if the second floor processing device is a wet cleaning robot, it is recommended that a first floor processing device have performed a vacuum cleaning operation beforehand. However, the floor processing activity of the second floor processing device, in the proposed case the mopping operation according to the second mentioned alternative, is only to take place if the floor type of the respective partial environmental area is also suitable for floor processing by the second floor processing device, here specifically a wet cleaning operation.

In addition, it can happen that the first floor processing device has already processed more than a single partial environmental area by the time that it detects a second floor processing device in the environment. If several partial environmental areas are suitable for floor processing by the second floor processing device on the already traversed movement route of the first floor processing device, it is recommended that a control device of the second floor processing device establish its own movement route that is suitable for floor processing by the second floor processing device. For example, distances between the partial environmental areas can in this case be determined that are suitable for floor processing by the second floor processing device. The distances are added up in various combinations, and the movement route having a smallest total route length is selected for connecting the partial environmental areas. In this way, there is a simultaneous determination of the sequence in which the second floor processing device processes the partial environmental areas and the location of a starting point and ending point of the movement route of the second floor processing device.

In a case where the first floor processing device could not detect the second floor processing device while performing the first floor processing activity, it is proposed that the completion of the first floor processing activity be followed by the first floor processing device transmitting a status message about the completed first floor processing activity to the second floor processing device and/or the shared computing device. In this case, the second floor processing device cannot obtain any information about its position within the first area map of the first floor processing device. The second floor processing device must thus itself generate a map and self-localize. However, the first floor processing device transmits a status message to the second floor processing device or a shared computing device, for example so as to notify the second floor processing device about the partial environmental areas in the environment in which a floor processing operation by the first floor processing device has already taken place. The status message can refer to partial environmental areas that are stored in an area map of the first floor processing device. The status message can be transmitted to the second floor processing device as soon as the first floor processing device has detected the second floor processing device. As a consequence, if the first floor processing device does not detect the second floor processing device while performing the first floor processing activity, the first floor processing device initially ends the first floor processing activity, and then later transmits information and/or a request for a subsequent second floor processing activity to the second floor processing device. According to a possible embodiment, the second floor processing device then implements a standard processing mode without accessing an already stored area map. While performing the floor processing activity, the second floor processing device advantageously generates its own area map, by using detection results detected by a separate detection device of the second floor processing device.

In this sense, it is proposed that the second floor processing device receive the status message of the first floor processing device, and thereupon start a second floor processing activity. The second floor processing device then preferably detects environmental features in the environment itself, generates a second area map based on the detected environmental features, and performs the second floor processing activity based on the second area map.

Aside from the method described above for operating a system, the invention also proposes a system with a first floor processing device and a second floor processing device, which is designed to implement a method described above. The features and advantages described above in relation to the method thus also arise correspondingly for the system according to the invention. In order to avoid repetition, reference is made to the preceding statements.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
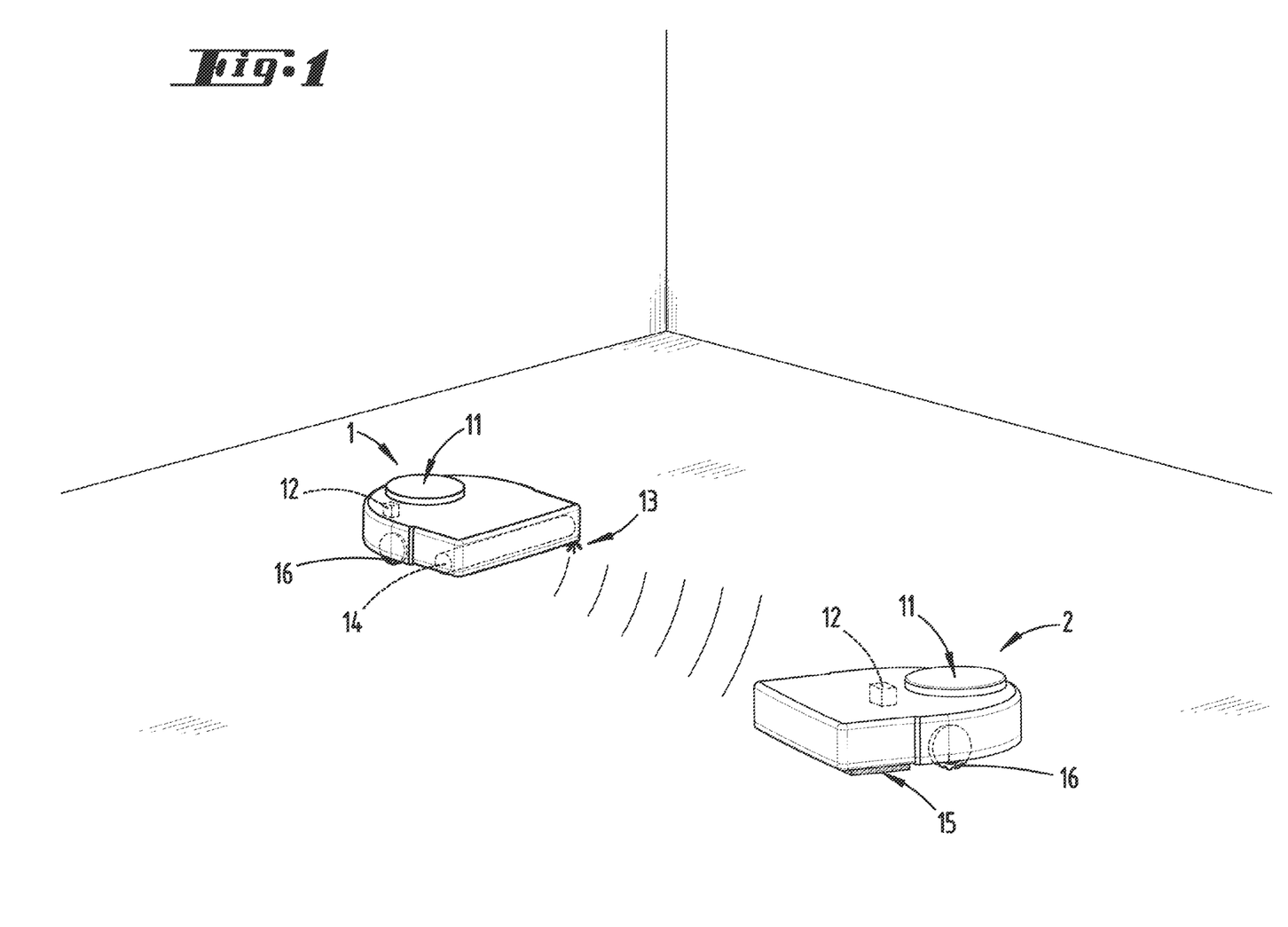
FIG. 1 is a system with a first floor processing device and a second floor processing device according to a first embodiment.

FIG. 1 initially shows a system according to the invention with two floor processing devices 1, 2, specifically a first floor processing device 1 and a second floor processing device 2. The floor processing devices 1, 2 are designed as automatically moving cleaning robots, and each have driven wheels 16 for moving the floor processing device 1, 2 within an environment denoted by a sketch, for example a home. In addition, the floor processing devices 1, 2 have different floor processing elements 13, 14, 15 depending on the device type. For example, the first floor processing device 1 is here designed as a vacuuming robot, and has a bristle roller (floor processing element 14) that rotates around a horizontal axis as well as a side brush (floor processing element 13), which protrudes over a layout of the housing of the floor processing device 1 and can rotate around an essentially vertical axis. For example, the second floor processing device 2 is here designed as a mopping robot, and has a mopping plate (floor processing element 15). In addition, each of the floor processing devices 1, 2 has a detection device 11 for detecting obstacles 17 within the environment. As shown on FIGS. 2 and 3, the obstacles can be furniture items, walls, or even other objects within the environment. For example, the detection device 11 is here a laser scanner, which works according to the triangulation principle. A laser source (not shown) emits a laser beam, for example, which is diverted by optical elements in such a way that the laser beam of the floor processing device 1, 2 exits essentially parallel to a surface to be processed. Arranging the laser source or even the allocated diverting elements on a rotary plate makes it possible to achieve a 360° measurement around the floor processing device 1, 2, for example. Each of the floor processing devices 1, 2 here further has a computing device 12, which processes the distance values to obstacles 7 detected by the detection device 11 into an area map 4. A movement route 5, 10 can be planned for the first or second floor processing device 1, 2 based on the area map 4, which depicts a layout of the environment along with obstacles 17 contained therein.

Even though both floor processing devices 1, 2 have a detection device 11 as well as a computing device 12 for generating an area map 4 in the exemplary embodiments shown, a special embodiment of the invention can provide that only the first floor processing device 1 have such a detection device 11, for example, while the second floor processing device 2 orients itself within the environment based on the area map generated and transmitted by the first floor processing device 1.

Figure 4:
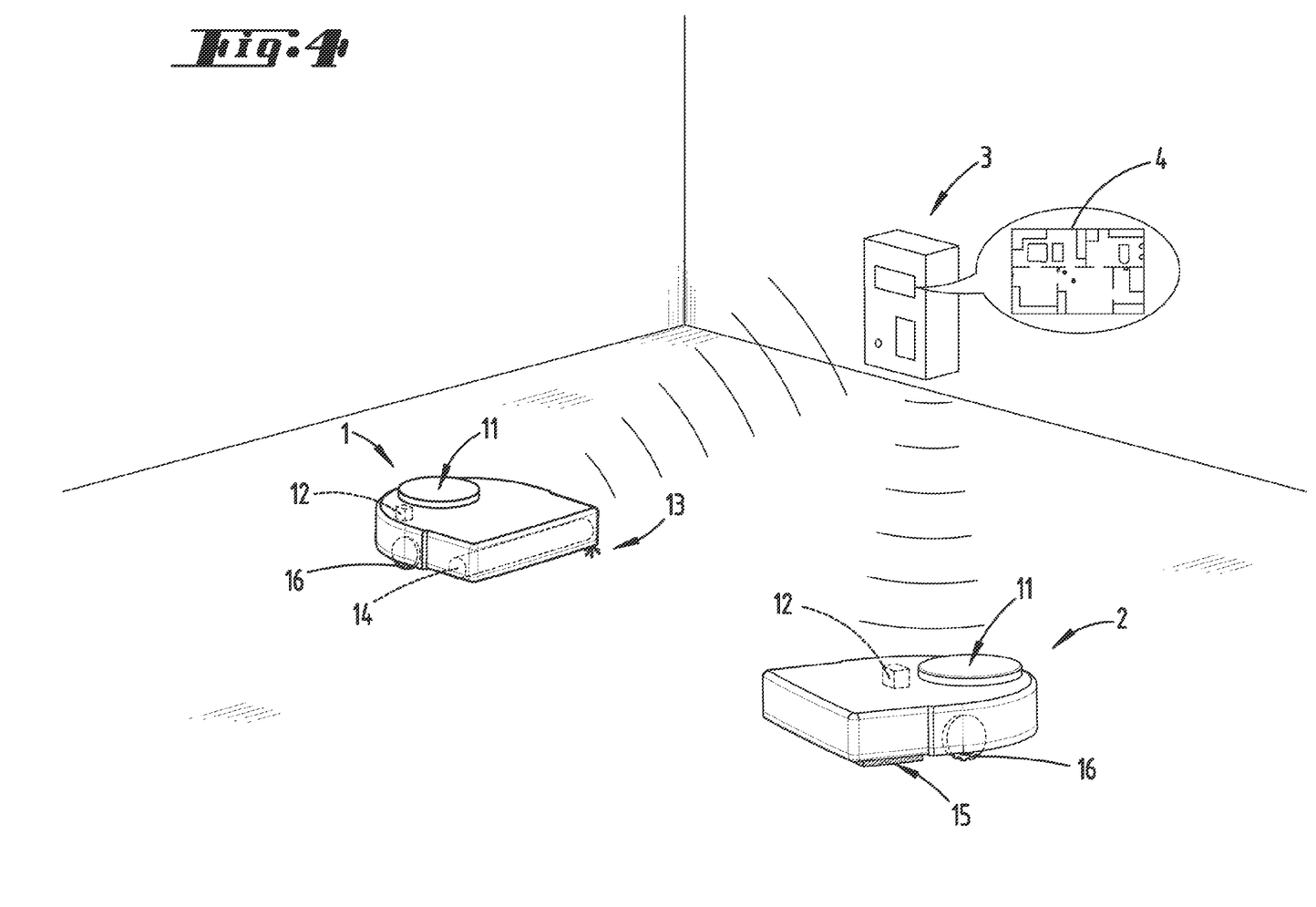
FIG. 4 is a system with two floor processing devices and a shared computing device allocated thereto according to another embodiment.

In addition, the floor processing devices 1, 2 have data communications devices (not shown), for example WLAN or Bluetooth radio modules, by means of which the floor processing devices 1, 2 can communicate with each other or also with an external computing device 3 (see FIG. 4). The system with the depicted two or even more floor processing devices 1, 2 can advantageously have a wireless communications network, in particular a so-called smart home network. Aside from the floor processing devices 1, 2 as well as a computing device 3, the network can also contain other devices, for example other household devices and/or computers. In particular, there can be a communications link to a mobile communications device, for example a smartphone, a tablet PC, or others. The communications device can have installed on it an application, by means of which a user of the system can control one or several floor processing devices 1, 2, view or change their area maps 4, among other things.

Figure 2:
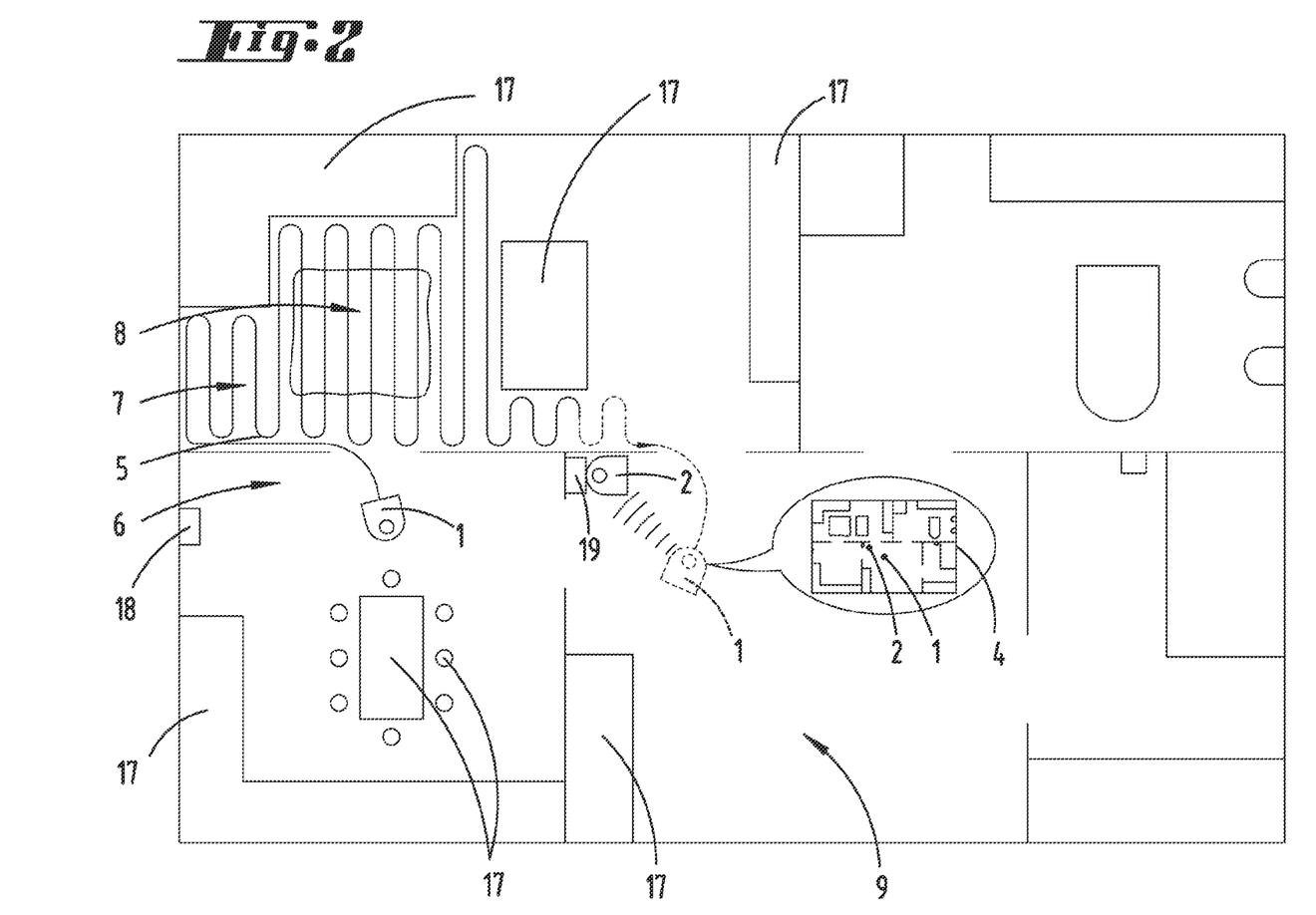
FIG. 2 is a sketched environment of the floor processing devices with the transmission of an area map generated by the first floor processing device to the second floor processing device.
Figure 3:
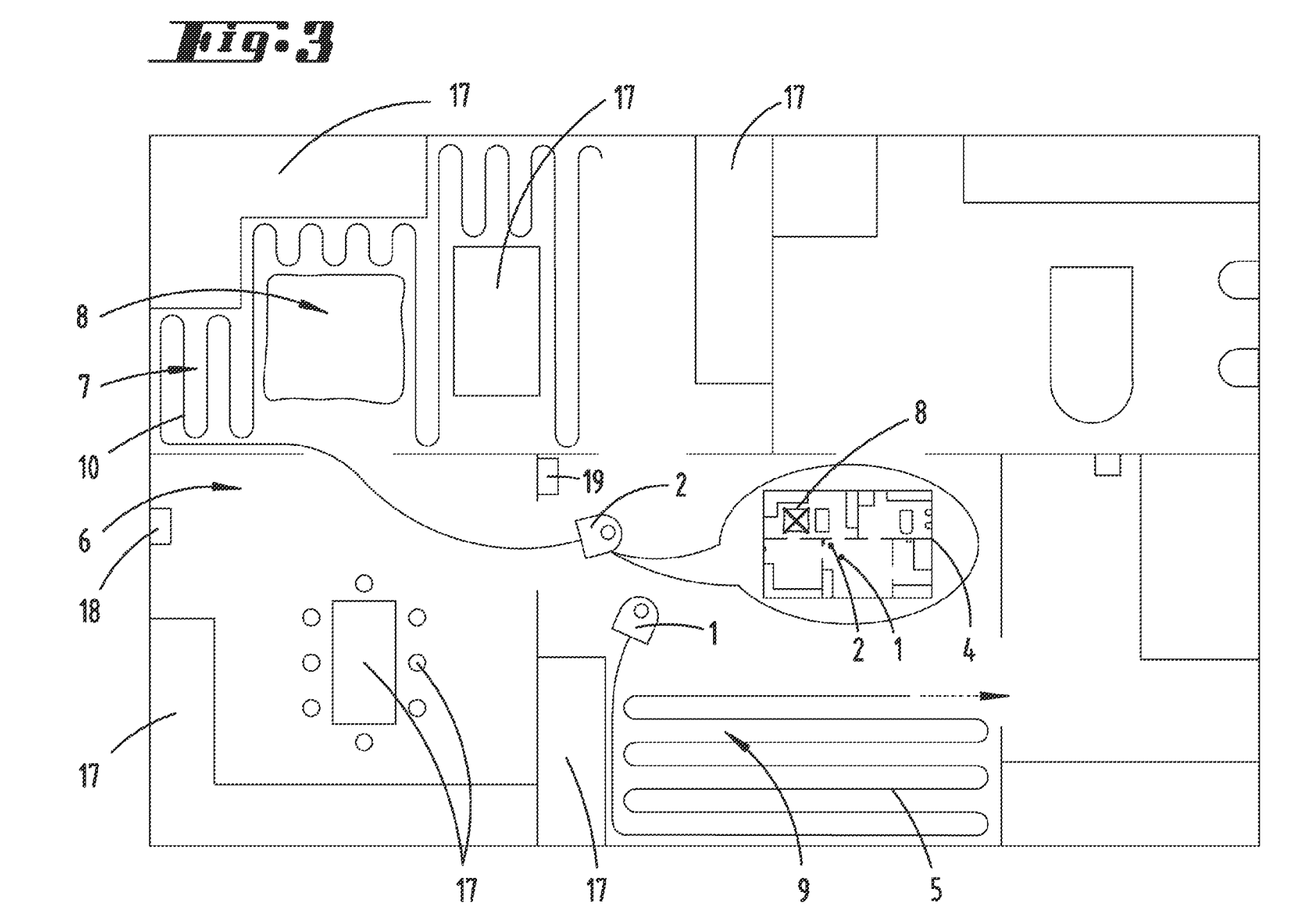
FIG. 3 is the environment illustrated on FIG. 2 with a movement route of the second floor processing device based on a modified area map.

In the following, FIGS. 2 and 3 show the operation of the floor processing devices 1, 2, in which a direct communication illustrated on FIG. 1 between the floor processing devices 1, 2 is used to transmit an area map 4 of the first floor processing device 1 to the second floor processing device 2.

FIG. 2 shows a layout of a home, within which the two floor processing devices 1, 2 are located. The home has a plurality of partial environmental areas 6, 7, 8, 9, of which the partial environmental areas 6, 9 are rooms of the home, and partial environmental areas 7, 8 are various areas of a room, specifically a carpet (partial environmental area 8), which is only to be cleaned by the first floor processing device 1, and the remaining area (partial environmental area 9) of the room next to the carpet. In principle, partial environmental areas 6, 7, 8, 9 can be defined as desired by a user of the system, in particular via the aforementioned application, or also established automatically via a computing device 12 of a floor processing device 1, 2. Also located in the depicted environment are base stations 18, 19, specifically a first base station 18 for the first floor processing device 1 and a second base station 19 for the second floor processing device 2. The first base station 18 is located in a first partial environmental area 6 of the home, while the second base station 19 is here located in another partial environmental area 9. The floor processing devices 1, 2 and preferably also the base stations 18, 19 have a clear identification code, with which the latter can be identified by other floor processing devices 1, 2 by means of a corresponding device. For example, the identification code can be an optical code, such as a barcode, QR code or the like. In addition, use can be made of electronic tags containing an identifiable code. For example, such tags can be RFID tags, NFC tags or Bluetooth beacons. It is essential that the identification code clearly identify a floor processing device 1, 2 or a base station 18, 19, and that it can be read by corresponding detection devices. The identification codes are preferably stored in a storage device shared by the floor processing devices 1, 2 or base stations 18, 19. In addition, the floor processing devices 1, 2 have one or several sensor devices for detecting a floor type that arises in the partial environmental areas 6, 7, 8, 9, a contamination type and/or a contamination level of a partial environmental area 6, 7, 8, 9. In terms of floor type, for example, a distinction can be made between floor types such as carpet or carpeted floors and hard floors. For example, the hard floors include laminate, tiles, and parquet. For example, the devices for detecting the floor type, contamination type or contamination level can be optical or mechanical detection devices. For example, use can be made of a camera with an image processing program, which is suitable for identifying a floor type, contamination type or a contamination level. For example, the contamination type can involve contamination of varying consistency, for example liquid, solid, sticky, or the like. The contamination level denotes a severity of contamination, for example divided into categories such as low, medium, and high. In addition, a contamination level can also be expressed as a percentage of a maximum possible contamination, as a dirt particle concentration per defined partial surface area, or the like.

A possible exemplary embodiment will now be described in more detail based on FIGS. 2 and 3. The first floor processing device 1 starts a floor processing run, for example proceeding from its base station 18, and follows a movement route 5 that meanders through the partial environmental areas 6, 7, 8, 9, while leaving out those areas that have obstacles 17 it cannot travel underneath. The carpet present in the partial environmental area 8 can likewise be traversed and cleaned by the floor processing device 1. An area map 4 does not yet exist here at the time the movement of the first floor processing device 1 starts, for example. Rather, the first floor processing device 1 itself generates an area map 4 for itself. To this end, the detection device 11 of the first floor processing device 1 detects distances to obstacles 17, to also include room boundaries, within the environment of the first floor processing device 1. The area map 4 contains a layout with the obstacles 17 detected therein. The movement of the first floor processing device 1 along the movement route 5 and generation of the area map 4 take place simultaneously, so that the area map 4 is continuously updated and expanded the further the floor processing device 1 progresses along the movement route. Simultaneously with the movement, corresponding sensors of the floor processing device 1 can recognize a floor type, a contamination level and/or a contamination type of one or several partial environmental areas 6, 7, 8, 9, and directly enter it into the area map 4, specifically allocate it to the respective partial environmental area 6, 7, 8, 9. The first floor processing device 1 is further designed to localize itself within the generated area map 4, i.e., to determine its own position and orientation within the environment.

As soon as the first floor processing device 1 has detected the second floor processing device 2, the position of the second floor processing device 2 within the area map 4 of the first floor processing device 1 is noted. The first floor processing device 1 identifies the second floor processing device 2 based on its clear identification, for example specifically a QR code applied to the housing of the second floor processing device 2, and clearly establishes its identity through a comparison with identification codes of various floor processing devices stored in the database. In addition, communication between the two floor processing devices 1, 2 can support the first floor processing device 1 to clearly identify the second floor processing device 2. If the first floor processing device 1 recognizes the second floor processing device 2 as a floor processing device 1, 2 based on its exterior shape, the first floor processing device 1 can send out a query signal into the environment. This query signal can contain a request to other floor processing devices 1, 2 to look around the environment, and likewise also search for floor processing devices 1, 2. The floor processing device 2 which then finds a floor processing device 1 in its environment has with a high probability detected the first floor processing device 1. As a result, both floor processing devices 1, 2 know which other floor processing device 1, 2 is located in its environment.

In addition, a conclusion can also be drawn about the corresponding floor processing device 1, 2 based on the identification of a base station 18, 19 belonging to a specific floor processing device 1, 2. For example, the first floor processing device 1 in the partial environmental area 9 can here detect the base station 19 of the second floor processing device 2, and recognize it based on an identification code arranged on the base station 19. If the second floor processing device 2 has for its part generated a local area map 4, which base station 18, 19 is involved can be established by comparing the local area maps 4 of the second floor processing device 2 and the first floor processing device 1.

As shown on FIG. 2, the first floor processing device 1 now detects the second floor processing device 2 present in the partial environmental area 9, and transmits the area map 4 it has generated up to that point to the second floor processing device 2. The area map 4 contains an estimated position of the second floor processing device 2. Based upon the received area map 4, the second floor processing device 2 has knowledge about its current position in the area map 4 of the first floor processing device 1, i.e., in the coordinates of the first floor processing device 1, information about cleaned areas on the movement route 5 of the first floor processing device 1, and information about the floor types traversed in the partial environmental areas 6, 7, 8, 9, for example also including that a carpet is present in the partial environmental area 8 that cannot be cleaned by the second floor processing device 2, and thus is also not to be traversed. In the exemplary embodiment according to FIGS. 1 to 3, the area map 4 is transmitted to the second floor processing device 2 directly via wireless communication, without any intermediate transmission to an external terminal, a server, or the like, for example. Based on the area map 4, the information collected by the first floor processing device 1 about a floor type, a contamination type and/or a contamination level are known to the second floor processing device 2. In addition, the second floor processing device 2 knows about the covered movement route 5 of the first floor processing device 1. The computing device 12 of the second floor processing device 2 can locally store the area map 4, and plan its own movement route 10 for the second floor processing device 2, for example which here leaves out the partial environmental area 8 that contains the carpet.

When the area map 4 is being transmitted by the first floor processing device 1 to the second floor processing device 2 and the second floor processing device 2 begins a floor processing activity, the first floor processing device 1 continues its floor processing activity and movement, i.e., floor processing by the second floor processing device 2 is already started while the first floor processing device 1 is performing its floor processing activity. As a result, the floor processing activities can advantageously complement each other and be performed in a time-saving manner, since the second floor processing device 2 does not have to wait until the first floor processing device 1 has ended its floor processing activity. The second floor processing device 2 approaches those partial environmental areas 6, 7, 9 that are located on the movement route 5 of the first floor processing device 1, and have floor types that can be cleaned or are to be cleaned by the second floor processing device 2. The partial environmental area 8 having the carpet is thus not integrated into the movement route 10 of the second floor processing device 2. As it keeps moving along the movement route 5, the first floor processing device 1 continues to detect obstacles 17 within the environment, and expands or updates its area map 4, which is then in turn preferably continuously made available to the second floor processing device 2. For example, a user of the system can have the progress of the floor processing activities of both floor processing devices 1, 2 displayed on an external terminal, for example a mobile phone.

The planning of the movement route 10 for the second floor processing device 2 can be attached to defined conditions. For example, if the first floor processing device 1 has not yet cleaned a hard floor before the first floor processing device 1 has detected the second floor processing device 2, the second floor processing device 2, here specifically the mopping robot, is not activated, since the latter is only suitable for hard floor processing. However, the position of the second floor processing device 2 detected by the first floor processing device 1 is noted within the area map 4. As soon as the floor processing device 1 has thereupon detected and cleaned a hard floor, this is noted in the area map 4 or a corresponding indication is transmitted to the second floor processing device 2, so that the computing device 12 of the second floor processing device 2 can initiate a cleaning by the floor processing device 2 in this partial environmental area 6, 7, 9.

In addition, the start of floor processing by the second floor processing device 2 can be made dependent on a minimum surface area of a partial environmental area 6, 7, 8, 9 to be cleaned. If the first floor processing device 1 has only begun with cleaning a hard floor shortly before detection of the second floor processing device 2, it makes sense to still delay the start signal for floor processing by the second floor processing device 2 until a minimum surface area has been precleaned, i.e., vacuumed, by the first floor processing device 1. It is thus proposed that the second floor processing device 2 only be started if the hard floor surface already processed by the first floor processing device 1 has a minimum surface area or has even been completely cleaned. At the same time, this means that the partial environmental area 6, 7, 8, 9 could then also be completely mapped. If a hard floor surface is released for cleaning by the second floor processing device 2, the computing device 12 of the second floor processing device 2 starts a floor processing activity by the second floor processing device 2. A starting location for the floor processing activity of the second floor processing device 2 is preferably established in such a way as to yield a shortest distance between the current whereabouts of the second floor processing device 2 and the partial environmental areas 6, 7, 9 to be cleaned or the planned movement route 10 of the second floor processing device 2. If the first floor processing device 1 has cleaned more than a hard floor surface to be cleaned by the second floor processing device 2, here the partial environmental areas 6, 7, 9, prior to the start of the second floor processing device 2, a shortest possible movement route 10 is planned for the second floor processing device 2 that contains all partial environmental areas 6, 7, 9 to be cleaned. As a result, the sequence in which the second floor processing device 2 cleans the partial environmental areas 6, 7, 9 is simultaneously established. The movement route 10 of the second floor processing device 2 must thus not be identical to the movement route 5 of the first floor processing device 1. As a consequence, a required timespan and energy level for floor processing by the second floor processing device 2 can simultaneously also be kept as low as possible. The movement route 10 for the second floor processing device 2 is advantageously changed or complemented when the movement route 5 of the first floor processing device 1 is also changed or complemented, and relates to partial environmental areas 6, 7, 8, 9 that are likewise to be cleaned by the second floor processing device 2.

In the case where the first floor processing device 1 does not even detect any other floor processing device 2 during its floor processing activity, the first floor processing device 1 ends its floor processing activity per the plan, and transmits information about its successful floor processing, for example to an external computing device 3 or other floor processing devices 1, 2, which are known to the first floor processing device 1 within the system. A second floor processing device 2 can thereupon perform its own floor processing activity, wherein the first area map 4 of the first floor processing device 1 with a position of the second floor processing device 2 recorded therein is not available, however. Rather, the second floor processing device 2 must generate its own area map 4, for which purpose the separate detection device 11 of the second floor processing device 2 is used. Upon successfully ending its floor processing activity, the first floor processing device 1 can in particular send a status message to a so-called cloud, by means of which the second floor processing device 2 in turn acquires information about the ended floor processing activity of the first floor processing device 1, and can start its own floor processing activity. When starting its floor processing activity, the second floor processing device 2 thus has no knowledge about the area map 4, and also no knowledge about specific floor types in partial environmental areas 6, 7, 8, 9 of the environment, so that the second floor processing device 2 must initially itself procure its relevant information about the environment.

Finally, FIG. 4 shows another possible embodiment of the invention, in which the floor processing devices 1, 2 do not communicate with each other directly, but rather via an external computing device 3. During a floor processing operation, the first floor processing device 1 sends the area map 4 it has generated and continuously updated up to that point to the external computing device 3. The area map 4 is there stored and transmitted to the second floor processing device 2 or prepared for retrieval. The area map 4 is thus stored centrally within the external computing device 3, and is there managed and updated. Additional information about the partial environmental areas 6, 7, 8, 9 present in the area map 4 are collected and/or exchanged, so that the floor processing devices 1, 2 networked in the system must basically just transmit status information and surface information to the computing device 3. The computing device 3 can basically also have a cross-device, i.e., global, persistent area map 4, in which is recorded information detected by the floor processing devices 1, 2, for example floor type, dirt quantity, dirt type and the like. The floor processing devices 1, 2 can access the area map 4 stored in the computing device 3, for example to transmit or acquire information about a current position and orientation of another floor processing device 1, 2.

Although only a few embodiments of the present invention have been shown and described, it is to be understood that many changes and modifications may be made thereunto without departing from the spirit and scope of the invention.

REFERENCE LIST

1 Floor processing device
2 Floor processing device
3 Computing device
4 Area map 5 Movement route
6 Partial environmental area
7 Partial environmental area
8 Partial environmental area
9 Partial environmental area
10 Movement route
11 Detection device
12 Computing device
13 Floor processing device
14 Floor processing device
15 Floor processing device
16 Wheel
17 Obstacle
18 Base station
19 Base station

What is claimed is:

1. A method for operating a system with a first automatically moving floor processing device and a second automatically moving floor processing device, comprising the steps of:
   detecting with the first floor processing device environmental features in an environment of the first floor processing device, the first floor processing device and the second floor processing device communicating with each other by data communication means,
   generating a first area map by the first floor processing device or a shared computing device allocated to both the first floor processing device and the second floor processing device, the first area map being based on the detected environmental features, and
   detecting with the first floor processing device the second floor processing device,
   storing a position of the second floor processing device within the generated first area map of the first floor processing device,
   transmitting, by the first floor processing device, the first area map created during the step of generating to the second floor processing device,
   receiving with the second floor processing device the first area map and information about a current position of the second floor processing device within the first area map already during a first floor processing activity performed by the first floor processing device, and
   controlling, by a control device of the second floor processing device, a second floor processing activity independently based on the first area map and the received information about the current position of the second floor processing device with in the first area map as soon as the first floor processing device has detected the second floor processing device, wherein the second floor processing device does not generate an area map, and receives information required for navigation during second floor processing activity based on information received from only the first area map already generated by the first floor processing device, wherein the first floor processing device and the second floor processing device each have individual identification codes in the form of optical codes or electronic codes that are recognized by other floor processing devices, wherein the first floor processing device and the second floor processing device have corresponding detection devices, with which the identification codes are read out, and wherein the identification codes of the floor processing devices are stored in a database that is accessible by all floor processing devices of the system.

2. The method according to claim 1, wherein the first area map and the position of the second floor processing device noted therein are continuously updated during a movement of the first floor processing device.

3. The method according to claim 1, wherein the first floor processing device detects floor parameters of partial environmental areas of the environment, in particular a floor type, a contamination type or a contamination level, or detects an operating state of partial environmental areas processed or not processed by the first floor processing device, or a movement route of the first floor processing device through one or several partial environmental areas, and stores them in the first area map, or transmits them to the shared computing device.

4. The method according to claim 1, wherein the second floor processing activity is performed at a location on a movement route of the first floor processing device.

5. The method according to claim 4, wherein the second floor processing activity of the second floor processing device is only performed in a specific partial environmental area when a first floor processing activity was performed in this partial environmental area beforehand by the first floor processing device, or is only performed if the second floor processing device is suitable for processing the floor of this partial environmental area.

6. A system comprising a first floor processing device and a second floor processing device, wherein the system is designed for implementing the method according to claim 1.

* * * * *